(12) United States Patent
Krithivas (10) Patent No.: US 7,516,252 B2
(45) Date of Patent: Apr. 7, 2009

(54) PORT BINDING SCHEME TO CREATE VIRTUAL HOST BUS ADAPTER IN A VIRTUALIZED MULTI-OPERATING SYSTEM PLATFORM ENVIRONMENT

(75) Inventor: Ramamurthy Krithivas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 498 days.

(21) Appl. No.: 11/147,983

(22) Filed: Jun. 8, 2005

(65) Prior Publication Data
US 2006/0282591 A1 Dec. 14, 2006

(51) Int. Cl.
G06F 3/00 (2006.01)
G06F 13/24 (2006.01)
G06F 13/26 (2006.01)
H04L 12/28 (2006.01)

(52) U.S. Cl. .................. 710/37; 710/260; 710/264; 710/269; 370/351

(58) Field of Classification Search .......... 710/36, 710/37
See application file for complete search history.

(56) References Cited

U.S. PATENT DOCUMENTS

| | | | |
|---|---|---|---|
| 4,748,575 A | 5/1988 | Ashkin et al. | |
| 5,109,484 A | 4/1992 | Hughes et al. | |
| 5,230,052 A | 7/1993 | Dayan et al. | |
| 5,241,490 A | 8/1993 | Poon | |
| 5,241,634 A | 8/1993 | Suzuki | |
| 5,247,683 A | 9/1993 | Holmes et al. | |
| 5,345,405 A | 9/1994 | Walsh et al. | |
| 5,375,241 A | 12/1994 | Walsh | |
| 5,452,454 A | 9/1995 | Basu | |
| 5,471,410 A | 11/1995 | Bailey et al. | |
| 5,577,210 A | 11/1996 | Abdous et al. | |
| 5,671,413 A | 9/1997 | Shipman et al. | |
| 5,752,032 A | 5/1998 | Keller et al. | |
| 5,862,389 A | 1/1999 | Kardach et al. | |
| 5,880,978 A | 3/1999 | Panwar et al. | |
| 5,943,673 A | 8/1999 | Felouzis et al. | |
| 5,999,989 A | 12/1999 | Patel | |
| 6,014,511 A | 1/2000 | Krithivas et al. | |
| 6,080,207 A | 6/2000 | Kroening et al. | |
| 6,081,867 A * | 6/2000 | Cox ........................ 710/264 | |
| 6,081,890 A | 6/2000 | Datta | |

(Continued)

FOREIGN PATENT DOCUMENTS

JP 06/290084 A 10/1994

(Continued)

OTHER PUBLICATIONS

International Preliminary Examination Report (IPRP), Jul. 13, 2006, for International Application No. PCT/US 2004/042755.

(Continued)

*Primary Examiner*—Niketa I Patel
*Assistant Examiner*—Zachary K Huson
(74) *Attorney, Agent, or Firm*—Christopher K. Gagne (57) ABSTRACT

Some embodiments include apparatus and method to allocate ports of host bus adapters in computer systems to multiple operating systems in the computer systems. Other embodiments are described and claimed.

30 Claims, 5 Drawing Sheets

U.S. PATENT DOCUMENTS

| | | | |
|---|---|---|---|
| 6,173,350 | B1 | 1/2001 | Hudson et al. |
| 6,199,159 | B1 | 3/2001 | Fish |
| 6,209,089 | B1 | 3/2001 | Selitrennikoff et al. |
| 6,317,826 | B1 | 11/2001 | McCall et al. |
| 6,324,644 | B1 | 11/2001 | Rakavy et al. |
| 6,353,924 | B1 | 3/2002 | Ayers et al. |
| 6,381,693 | B2 | 4/2002 | Fish |
| 6,427,176 | B1 | 7/2002 | Berglund et al. |
| 6,633,976 | B1 | 10/2003 | Stevens |
| 6,708,271 | B1 | 3/2004 | Sasaki et al. |
| 6,816,963 | B1 | 11/2004 | Krithivas et al. |
| 7,155,492 | B2 | 12/2006 | Obara et al. |
| 7,181,531 | B2 | 2/2007 | Pinkerton et al. |
| 7,349,999 | B2 | 3/2008 | Krithivas |
| 2001/0007119 | A1 | 7/2001 | Katayama et al. |
| 2002/0174353 | A1 | 11/2002 | Lee |
| 2003/0154368 | A1 | 8/2003 | Stevens, Jr. et al. |
| 2003/0182484 | A1* | 9/2003 | Gaur et al. |
| 2005/0240932 | A1* | 10/2005 | Billau et al. ............... 718/104 |
| 2007/0299951 | A1 | 12/2007 | Krithivas |
| 2008/0098321 | A1 | 4/2008 | Krithivas |

FOREIGN PATENT DOCUMENTS

| | | |
|---|---|---|
| WO | WO 00/677787 A1 | 11/2000 |
| WO | WO 03/017598 | 2/2003 |
| WO | WO 03/067787 | 8/2003 |
| WO | WO 03/069471 A3 | 8/2003 |

OTHER PUBLICATIONS

Official Letter, Feb. 24, 2006, for Taiwan Application No. 93140505.

"Non-Final Office Action for U.S. Appl. No. 10/073,495 mailed on Jul. 14, 2006, 15 Pages.".

Intel Corporation.,Intel Pro/1000 T IP Storage Adapter: Frequently Asked Questions, 2 pages.

Intel Corp., "iSCSI: The Future of Network Storage", © 2002 Intel Corporation, pp. 1-7.

Krueger, M/, R. Haagens, C. Sapuntzakis, & M. Bakke, "Small Computer Systems Interface Protocol over the Internet (iSCSCI) Requirements and Design Considerations," RFC 3347, Jul. 2002, pp. 1-26.

Meth, K.Z. & J. Satran, "Features of the iSCSI Protocol," *IEEE Communications Magazine*, Aug. 2003, pp. 72-75.

PCT International Search Report for PCT/US2004/042755, Mailed on May 6, 2005.

"Final Office ACtion for U.S. Appl. No. 10/073,495 mailed on Aug. 31, 2007, 13 Pages.".

Sarkar, P., K. Vomganti, K. Meth, O. Biran, & J. Satran, "Internet Protocol Storage Area Networks", *IBM Systems Journal*, Jul. 2003.

Sarkar, P., S. Uttamchandani, K. Vorunganti, "Storage over IP: When Does Hardware Support Help?," *Proceedings of FAST '03: 2nd USENIX Conference on File amd Storage Technologies*, 2003, pp. 231-244.

Satran, J., K. Meth, C. Sapuntzakis, M. Chadalapaka, & E. Zeidner, "iSCSI", Internet Draft, Jan. 19, 2003, pp. 1-238.

Waikato Linux Users Group, "Cache", [online], Oct. 8, 2003, Retrieved from the Internet at <URL:http://www.wlug.org.nz/Cache>.

Davis et al.; "WBEM SLP Template"; Jan. 27, 2004;http://www.dmtf.org/standards/wbem/wbem.1.0.en; pp. 4.; Cite last visited Oct. 18, 2006.

Guttman et al.; "Request for Comments: 2609", "Service Templates and Service: Schemes", Jun. 1999, http://www.ietf.org/rfc/rfc2609.txt; pp. 33.; Cite last visited Oct. 18, 2006.

Charles Perkins, "SLP White paper topic", May 14, 1997, http://playground.sun.com/srvloc/slp_white_paper.html.; pp. 8.; Cite last visited Oct. 18, 2006.

"Response to Final Office Action for U.S. Appl. No. 10/073,495, filed on Oct. 31, 2007, 15 Pages.".

SNIA Storage Management Initiative CIM/WBEM Technology Backgrounder, 2002, Storage Networking Industry Association.; http://www.wbemsolutions.com/articles/cim_wbem_backgrounder.pdf,; pp. 2.; Cite last visited Oct. 19, 2006.

"Non-Final Office Action for U.S. Appl. No. 10/073,495 mailed on Jan. 4, 2008, 9 Pages.".

"Response to Non-Final Office Action for U.S. Appl. No. 10/073,495, filed on Apr. 4, 2008, 10 Pages.".

"Response to Final Office Action for U.S. Appl. No. 10/073,495, filed Jun. 8, 2006, 16 pages.".

"Final Office Action for U.S. Appl. No. 10/073,495 mailed on Mar. 6, 2006, 15 pages.".

U.S. Appl. No. 12/024,920, filed Feb. 1, 2008.

Weber, "Information Technology -SCSI Primary commands—2 (SPC-2)", Information Technology—SCSI Primary commands—2 (SPC-2), Weber (editor): dpANS Project T10/1236-D, Revision 20, Jul. 18, 2001. Reference No.: ISO?IEC 14776/312 : 200X.

"Response to Non Final Office Action for U.S. Appl. No. 10/073,495, filed on Dec. 15, 2005, 27 Pages.".

"Response to Non-Final Office Action for U.S. Appl. No. 10/073,495, filed on Aug. 2, 2007, 13 Pages.".

"Non-Final Office Action for U.S. Appl. No. 10/073,495 mailed on May 3, 2007, 13 Pages.".

"Response to Final Office Action for U.S. Appl. No. 10/073,495, filed on Feb. 21, 2007, 15 Pages.".

"Final Office Action for U.S. Appl. No. 10/073,495 mailed on Jan. 5, 2007, 14 Pages.".

"Response to Non Final Office Action for U.S. Appl. No. 10/073,495, filed on Nov. 20, 2006, 9 Pages.".

Hsiung, Harry, "EFI Training Session", Oct. 10, 2000.

Stevens, Curtis; "EFI A BIOS Vendor's Perspective"; Sep. 1, 1999; part of presentation "Extensible Firmware Interface: booting the new generation of Intel Architecture platforms.".

"Non-Final Office Action for U.S. Appl. No. 10/747,928 mailed on Jun. 7, 2007, 8 Pages.".

"Response to Non-Final Office Action for U.S. Appl. No. 10/747,928, filed on Sep. 7, 2007, 17 Pages.".

"Notice of Allowance for U.S. Appl. No. 10/747,928 mailed on Oct. 30, 2007, 8 Pages.".

"Non-Final Office Action for U.S. Appl. No. 10/073,495 mailed on Sep. 20, 2004, 15 Pages.".

"Response to Non-Final Office Action for U.S. Appl. No. 10/073,495, filed on Dec. 23, 2004, 23 Pages.".

"Final Office Action for U.S. Appl. No. 10/073,495 mailed on Mar. 4, 2005, 14 Pages.".

"Response to Final Office Action for U.S. Appl. No. 10/073,495, filed on May 5, 2005, 23 Pages.".

"Non-Final Office Action for U.S. Appl. No. 10/073,495 mailed on Jul. 14, 2005, 15 Pages.".

* cited by examiner

PORT BINDING SCHEME TO CREATE VIRTUAL HOST BUS ADAPTER IN A VIRTUALIZED MULTI-OPERATING SYSTEM PLATFORM ENVIRONMENT

FIELD

Embodiments of the present invention relate to computer systems with adapters and multiple operating systems.

BACKGROUND

Computer systems such as servers usually have a number of adapters that allow the systems to exchange data with other computers or devices. Examples of adapters are host bus adapters (HBAs). Most systems use HBAs as interfaces to access large capacity storage devices. These adapters are statically assigned to an operating system. In some newer computer systems, concurrently loading multiple operating systems is a key requirement. Providing additional adapters exclusively to each of these multiple operating systems increases the total cost of ownership of the system.

DESCRIPTION OF EMBODIMENTS

Figure 1:
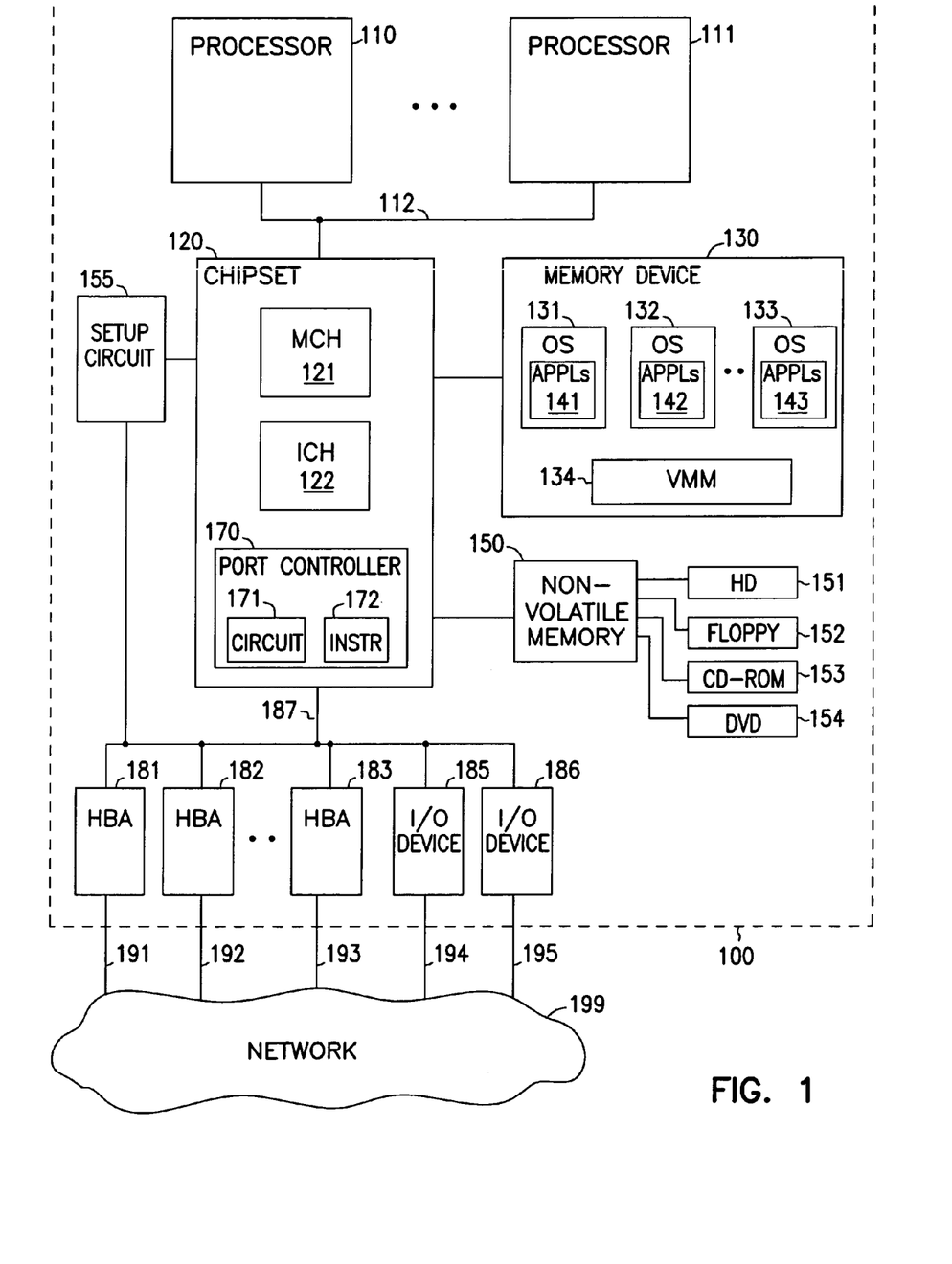
FIG. 1 shows a system according to an embodiment of the invention.

FIG. 1 shows a system according to an embodiment of the invention. System 100 includes processors 110 and 111, a processor interconnection 112, a chipset 120 having a memory control hub (MCH) 121 and an input/output (I/O) control hub (ICH) 122, a memory device 130, a non-volatile memory unit 150, host bus adapters (HBA) 181, 182, and 183, I/O devices 185 and 186, and an I/O interconnection 187.

In some embodiments, I/O interconnection 187 includes a bus that complies with the Peripheral Component Interconnect (PCI) Specification, Revision 2.2, Dec. 18, 1998. In other embodiments, I/O interconnection 187 includes a bus that complies with PCI-X Specification, Revision 1.0a, Jul. 24, 2000. In some other embodiments, I/O interconnection 187 includes a bus that complies with PCI-Express (PCI-E) Specification, Revision PCI-E, as specified in "The PCI Express Base Specification of the PCI Special Interest Group", Revision 1.0a. All of the PCI specifications are available from PCI Special Interest Group, Portland, Ore., USA. In this specification, the term "PCI" refers to any one of the PCI, PCI-X, and PCI-E mentioned above.

System 100 further includes network interconnections 191, 192, 193, 194, and 195 to communicate with a network 199. Examples of network interconnections 191, 192, 193, 194, and 195 include any combination of communication media such as metal wires, glass or fiber cables, and wireless media. Examples of network 199 include any combination of a local area network (LAN), a storage area network (SAN), and the internet.

Processors 110 and 111 include central processing units (CPUs) of any type of architecture, for examples, embedded processors, micro-controllers, digital signal processors, superscalar computers, vector processors, single instruction multiple data (SIMD) computers, complex instruction set computers (CISC), reduced instruction set computers (RISC), very long instruction word (VLIW), and hybrid architecture. In some embodiments, processors 110 and 111 are compatible with the Intel® Architecture (IA) processor, such as the IA-32 and the IA-64 architectures. In some embodiments, at least one of the processors 110 and 111 includes a multi-core processing unit formed on a single chip. FIG. 1 shows system 100 having two processors for illustrative purposes; other quantities of processors may be used in system 100. Thus, single processor or more than two processors may be included in system 100.

Processor interconnection 112 provides interface signals to allow processors 110 and 111 to communicate with each other and with other devices, such as with chipset 120. Examples of processor interconnection 112 include parallel bus, sequential bus, pipelined bus, asynchronous bus, synchronous bus, or any combination of these buses.

Memory control hub MCH 121 provides control and configuration to memory device 130 and input/output control hub ICH 122. In some embodiments, MCH 121 includes functions such as host-to-peripheral or processor-to-peripheral bus interface functions to support communication between processors 110 and 111 and other devices such as memory device 130.

Input/output control hub ICH 122 provides support for communication with host bus adapters 181, 182, and 183. In some embodiments, ICH 122 includes a number of interface and I/O functions such as PCI bus interface, processor interface, interrupt controller, direct memory access (DMA) controller, power management logic, timer, universal serial bus (USB) interface, non-volatile memory interface, and low pin count (LPC) interface. In some embodiments, ICH 122 is integrated into MCH 121 to perform the interface and I/O functions.

Memory device 130 stores information such as operating system (OS) 131, OS 132, and OS 133, applications 141, 142, and 143, and a virtual machine monitor (VMM) 134. In some embodiments, memory device 130 includes a dynamic random access memory (DRAM) device. In other embodiments, memory device 130 includes a static random access memory (SRAM) device. In some other embodiments, memory device 130 includes a flash memory device.

Applications, as discussed herein, include software programs that use system 100 and network 199. Examples of applications 141, 142, and 143 include Web browsers, e-mail serving applications, file serving applications, and database applications.

Operating systems, as discussed herein, relate to software for controlling communication between applications (141, 142, and 143) and resources of system 100 such as processors 110 and 111, memory device 130, non-volatile memory unit 150, and HBAs 181, 182, and 183, and I/O devices 185 and 186.

Virtual machine monitor VMM such as VMM 134 includes software to serve as host software of the system to allow multiple "guest" operating systems to concurrently use resources of the system.

In FIG. 1, VMM 134 includes software programs for allowing multiple operating systems such as operating systems 131, 132, and 133 to concurrently use the resources of system 100 such as processors 110 and 111, memory device 130, non-volatile memory unit 150, HBAs 181, 182, and 183, and I/O devices 185 and 186. In some embodiments, VMM 134 may partition at least one of the processors 110 and 111 into multiple processing portions (or virtual processors) and allocate the processing portions to operating systems 131, 132, and 133. For example, VMM 134 may partition processor 110 into a first processing portion and a second processing portion. VMM 134 may allocate the first processing portion to OS 131 and allocate the second processing portion to OS 132. VMM 134 may allocate the entire processor 111 to OS 133. Partitioning processors 110 and 111 allows multiple operating systems to efficiently share processor resources.

Non-volatile memory unit 150 includes machine-accessible media, for example, a hard disk 151, a floppy disk 152, a compact disk Read Only Memory (CD-ROM) 153, a digital versatile disc (DVD) 154, and any other magnetic or optical memory devices. Non-volatile memory unit 150 provides a mechanism to read machine-accessible media. In some embodiments, one or more of the machine-accessible media such as hard disk 151, a floppy disk 152, CD-ROM 153, and DVD 154 have associated information, wherein the information, when accessed, results in a machine performing the functions and methods described herein.

I/O devices 185 and 186 may include any combination of circuitry residing on a circuit board and circuit cards plugged into to sockets on the circuit board. Examples of I/O devices 185 and 186 include media cards such as communication cards to receive and transmit data via wireless media. Other examples of I/O devices 185 and 186 include network interface cards (NICs) such as Token Ring NIC and Ethernet NIC.

HBAs 181, 182, and 183 allow system 100 to exchange data with devices including storage devices in network 199. Examples of HBAs 181, 182, and 183 include PCI-E host bus adapters such as PCI to SCSI (small computer system interconnect) HBA, PCI-E to SAS (serial SCSI) HBA, PCI-E to SATA (serial advanced technology attachment) HBA, and PCI-E to Fiber Channel HBA.

System 100 also includes a setup circuit 155. Setup circuit 155 includes circuitry to store and execute instructions or codes. For example, setup circuit may store and execute BIOS (basic input output system) codes, or EFI (extensible firmware interface) codes, or both BIOS and EFI codes. FIG. 1 shows setup circuit 155 as a separate block. However, a portion or the entire setup circuit 155 may be included in one or a combination of chipset 120, processors 110 and 111, and memory device 130.

Figure 2:
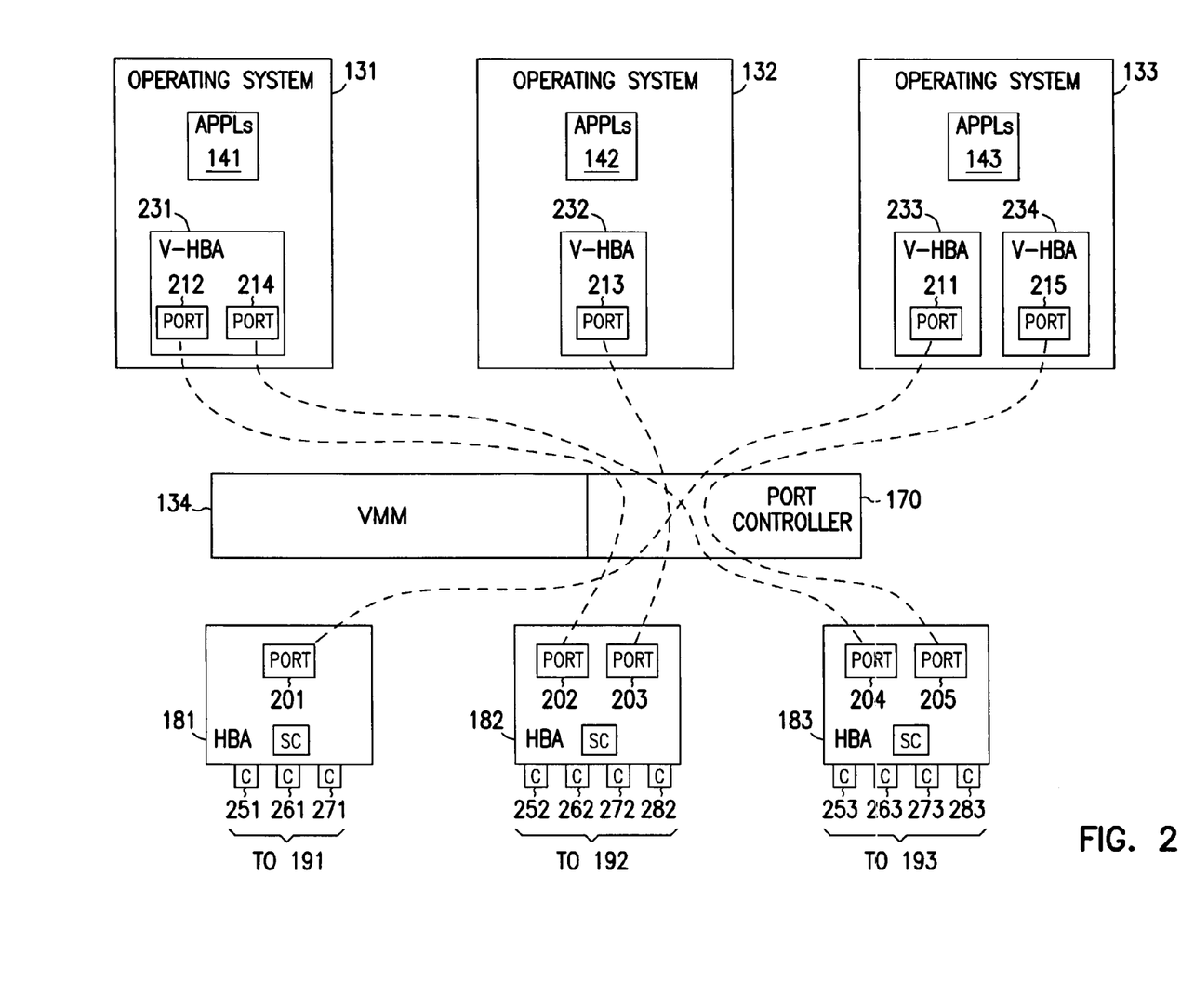
FIG. 2 illustrates a portion of the system of FIG. 1 showing an example of ports of HBAs being disaggregated and allocated to multiple operating systems

System 100 further includes a port controller 170. Port controller 170 allows any HBAs 181, 182, and 183 to be concurrently shared by operating systems 131, 132, and 133. Allowing operating systems 131, 132, and 133 to share any HBA among HBAs 181, 182, and 183 may decrease the total cost of ownership of system 100. Each of the HBAs 181, 182, and 183 includes at least one port (as shown in FIG. 2). In some embodiments, port controller 170 allows any one of the operating systems 131, 132, and 133 to claim a port on any HBAs 181, 182, and 183. Port controller 170 may also relay interrupt requests from HBAs 181, 182, and 183 to operating systems 131, 132, and 133 by methods that are described in FIG. 4 and FIG. 5.

Port controller 170 includes a circuit 171 and machine-executable instructions 172 to perform functions described herein. FIG. 1 shows circuit 171 and instructions 172 being within block 170. In some embodiments, circuit 171, or machine-executable instructions 172, or both may be included in one or a combination of processors 110, and 111, memory device 130, and VMM 134.

FIG. 2 illustrates a portion of system 100 of FIG. 1 showing an example of ports of the HBAs being disaggregated and allocated to operating systems 131, 132, and 133. In FIG. 2, each of the HBAs 181, 182, and 183 includes at least one port. HBA 181 includes port 201. HBA 182 includes ports 202 and 203. HBA 183 includes ports 204 and 205. A port refers to an end point for sending and receiving commands and for receiving data according to a standard. In embodiments represented by FIG. 2, ports 201 through 205 are end points for sending and receiving SCSI commands and receiving SCSI data. In some embodiments, ports 201 through 205 may issue commands and receive data according other standards. Each of the ports 201 through 205 has a unique address such as a World Wide Name (WWN). In a network such as a Fiber Channel network, a WWN may include multiple bits (e.g., a 48-bit address) to uniquely identify each element in the network.

Each of the HBAs 181, 182, and 183 includes connections (Cs) to transfer data. HBA 181 includes three connections 251, 261, and 271. HBA 182 includes four connections 252, 262, 272, and 282. HBA 183 includes four connections 253, 263, 273, and 283. The number of connections in each HBA may be different from the number of connections shown in FIG. 2.

In some embodiments, each of the connections 251, 261, 271, 252, 262, 272, 282, 253, 263, 273, and 283 includes a serial interface, for examples a SAS, a SATA, or a Fiber Channel interface, to transfer data serially.

In other embodiments, each of the connections 251, 261, 271, 252, 262, 272, 282, 253, 263, 273, and 283 include a parallel interface, for example a parallel SCSI interface, to transfer data in parallel.

In FIG. 2, each of the connections 251, 261, 271, 252, 262, 272, 282, 253, 263, 273, and 283 in HBAs 181, 182, and 183 corresponds to one physical layer (PHY) in the HBA. For example, in HBA 182, connections 253, 263, 273, and 283 correspond to four physical layers in HBA 182. The physical layer PHY discussed herein refers to the Physical Layer as define in the Open System Interconnection (OSI) model for transferring data. The OSI model is defined by the International Organization for Standardization (ISO) located at 1 rue de Varembé, Case postale 56 CH-1211, Geneva 20, Switzerland.

Management software or applications are commercially available to configure HBAs to create ports and associate the ports with one or more physical layers in the HBA. For example, HBA 182 may be configured such that port 202 is associated with connections 252 and 262; and port 203 is associated with connections 272 and 282. Each port may be associated with a single physical layer. Associating multiple physical layers with one port increases the bandwidth of the port.

Each of the HBAs 181, 182, and 183 includes a storage controller (SC) to control the functions of the corresponding HBA. Storage controller SC of each HBA may include a processor to process high speed data. In some embodiments, one or more of the storage controllers SCs in HBAs 181, 182, and 183 includes RAID (redundant array of independent disks) functionalities.

FIG. 2 shows a number of virtual HBAs (V-HBA) 231, 232, 233, and 234. Each operating system 131, 132, or 133 is associated with one or more virtual HBAs. The term virtual HBA is used because the HBA associated with each operating system is not a physical HBA. HBAs 181, 182, and 183 are the physical HBAs. Virtual HBA 231, 232, 233, and 234 in operating systems 131, 132, or 133 allows the operating systems to use one or more ports on any one of the physical HBAs 181, 182, and 183. Ports 211 through 215 (211, 212, 213, 214, and 215) on the virtual HBAs 231, 232, 233, and 234 are "virtual" ports.

Port controller 170 binds ports 211 through 215 on virtual HBAs 231, 232, 233, and 234 to ports 201 through 205 on physical HBAs 181, 182, and 183. The binding of the ports allows communication between operating systems 131, 132, and 133 and physical HBAs 181, 182, and 183.

Figure 3:
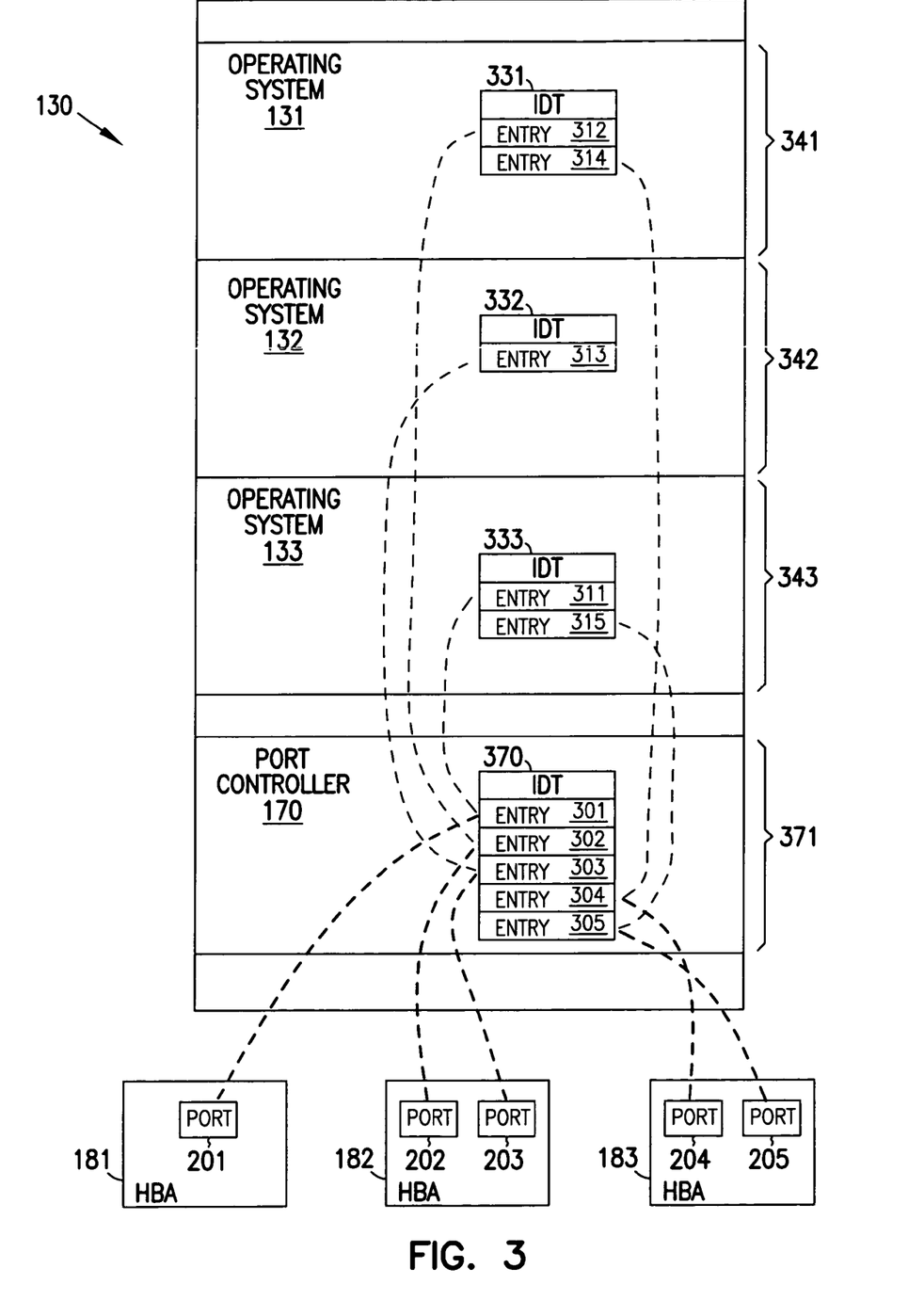
FIG. 3 shows a memory device of the system of FIG. 1

FIG. 3 shows memory device 130 having physical memory space occupied by operating systems 131, 132, and 133, and port controller 170. Each of the operating systems 131, 132, and 133, and port controller 170 occupies a unique physical memory space of memory device 130. For example, operating system 131 occupies physical memory space 341. Operating system 132 occupies physical memory space 342. Operating system 133 occupies physical memory space 343. Port controller occupies physical memory space 371.

Each of the operating systems 131, 132, and 133 includes a separate interrupt descriptor table (IDT), such as IDT 331, 332, or 333 in FIG. 3. Each of the operating systems 131, 132, and 133 uses the corresponding IDT (IDT) 331, IDT 332, or (IDT 333) to maintain entries. The entries contain information associated with the interrupt vectors that are assigned to virtual ports 211 through 215 on virtual HBAs 231, 232, 233, and 234 (FIG. 2). In FIG. 3, in IDT 331, entries 312 and 314 contain information associated with the interrupt vectors assigned to ports 212 and 214. In IDT 332, entries 313 contains information associated with the interrupt vector assigned to port 213. In IDT 333, entries 311 and 315 contain information associated with the interrupt vectors assigned to ports 211 and 215.

Port controller 170 includes an interrupt descriptor table IDT 370. Port controller 170 uses IDT 370 to maintain entries 301 through 305 (301, 302, 303, 304, and 305). Entries 301 through 305 of IDT 370 contain information associated with the interrupt vectors assigned to physical ports 201 through 205 on physical HBAs 181, 182, and 183.

In FIG. 3, the broken lines represent the associations among ports on physical HBAs 181, 182, and 183, port controller 170, and operating systems 131, 132, and 133. Port controller 170 is configured to retain binding information about the association shown by the broken lines in FIG. 3.

Figure 4:
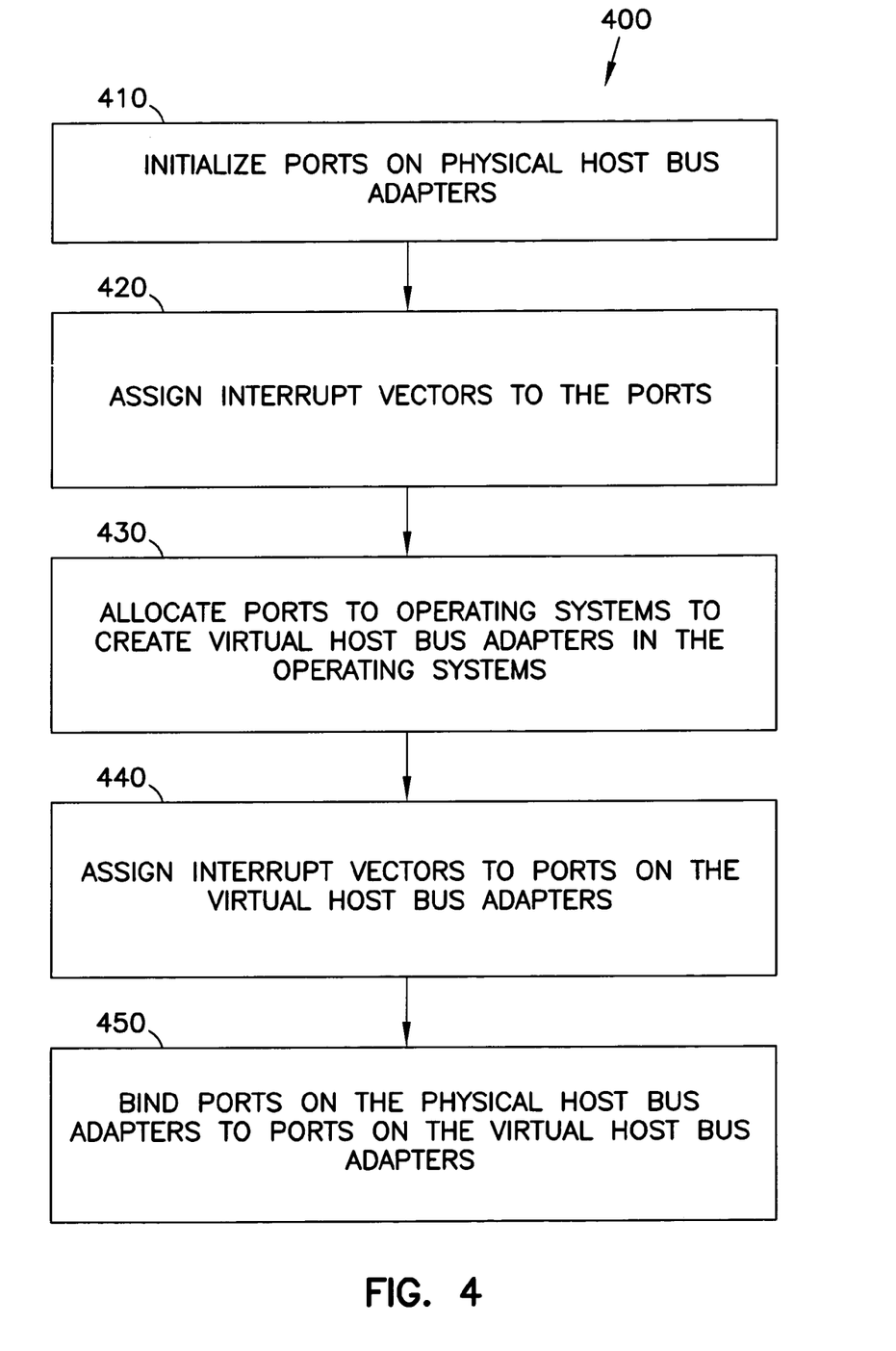
FIG. 4 is a flowchart showing a method according to an embodiment of the invention.

FIG. 4 is a flowchart of a method according to an embodiment of the invention. Method 400 is described in reference to system 100 shown in FIG. 1 through FIG. 3.

In box 410, system 100 initializes ports on physical HBAs. The physical HBAs refer to HBAs 181, 182, and 183 of shown in FIG. 1 through FIG. 3. The initialization includes enumerating ports 201 through 205 on HBAs 181, 182, and 183 shown in FIG. 2. In some embodiments, the enumeration is autonomously executed on all HBAs 181, 182, and 183 during power on stage of the system 100. In some embodiments, firmware of system 100 such as setup circuit 155 performs the enumeration. Port controller 170 collates a port inventory of ports 201 through 205 by enumerating all HBAs 181, 182, and 183 during a platform boot process of system 100.

In box 420, port controller 170 assigns an interrupt vector to each of the ports 201 through 205 of HBAs 181,182, and 183. HBAs 181,182, and 183 are PCI-Express compliant and handle an interrupt request using a message signaled interrupt (either MSI or MSI-X) request according to the PCI-Express specification. Each of the HBAs 181, 182, and 183 includes either a single function or multiple functions. During the activity of box 410 above, each port (instead of each function) of each of the HBAs 181, 182, and 183 requests an interrupt vector. For example, in HBA 182 of FIG. 2, each of the ports 202 and 203 requests an interrupt vector. The port uses the information associated with the interrupt vector during an interrupt request. The interrupt vector discussed herein refers to both MSI and MSI-X vectors according to the PCI-Express specification. The interrupt vector assigned to each port has an address value and one or more data values. Each of the address and data values includes multiple bits. Port controller 170 assigns the interrupt vector to each port (instead of each function) on each of the HBAs 181, 182, and 183.

Each of the HBAs 181, 182, and 183 includes a message address register to store the address value of the interrupt vector, and a message data register to store the data value of the interrupt vector. Each HBA uses the assigned address and data values during an interrupt request (MSI or MSI-X request) to request service.

In some embodiments, port controller 170 includes an interrupt descriptor table such as IDT 370 in FIG. 3, residing in the physical memory space of memory device 130. Port controller 170 uses the interrupt descriptor table to maintain entries of the interrupt vectors that are assigned ports 201 through 205 of HBAs 181, 182, and 183.

In box 430, port controller 170 allocates ports to operating systems 131, 132, and 133. In some embodiments, operating systems 131, 132, and 133 are loaded into memory device 130 during the activities in box 410 or box 420. When operating systems 131, 132, and 133 are loaded, device drivers of each operating system create a stub HBA. In some embodiments, each operating system 131, 132, or 133 may create a stub HBA based on information of HBAs 181, 182, and 183 from the activities in boxes 410 and 420. Device drivers of operating systems 131, 132, and 133 request one or more ports to associate the ports with the stub HBA to create the virtual HBA. FIG. 2 shows an example in which port controller 170 disaggregates ports 201 through 205 from physical HBAs 181, 182, and 183 and allocates the ports to operating systems 131, 132, and 133 to create virtual HBAs 231, 232, 233, and 234. In this example, port controller 170 allocates port 201 to operating system 133, port 202 to operating system 131, port 203 to operating system 132, port 204 to operating system 131, and port 205 to operating system 133. Thus, ports on the same (single) HBA (e.g., ports 202 and 203) may be allocated to different operating systems (e.g., OS 131 and OS 132). Ports from different HBAs (e.g., ports 201 and 205) may be allocated to the same operating system (e.g., OS 133). The broken lines in FIG. 2 represent the association between ports on virtual HBAs 231, 232, 233, and 234 and corresponding ports on physical HBAs 181, 182, and 183.

In box 440, each operating system assigns an interrupt vector to each port on the virtual HBAs 231, 232, 233, and 234. The interrupt vector in box 440 also refers to both MSI and MSI-X vectors according to the PCI specification. The interrupt vector assigned to each port on the virtual HBAs 231, 232, 233, and 234 has an address value and one or more data values. The address value of any port, either a port on a virtual HBA or a port on the physical HBA, is unique. The address value corresponds to a unique address in a physical memory space of memory device 130. In some embodiments, each of the operating systems 131, 132, and 133 and port controller 170 communicate with each other to allow the address and data values assigned to each port by the operating systems 131, 132, and 133 on the virtual HBAs to be recorded in port controller 170. Although each port on the virtual HBA is associated with a port on the physical HBA, the address values of the interrupt vectors of the associated (linked) ports are different. For example, port 201 on HBA 181 may have an interrupt vector with address and data values (ADDR1, DATA1), and port 211 (associated to port 201) may have interrupt vector with address and data values (ADDR2, DATA2), where ADDR1 is different from ADDR2.

In some embodiments, each of the operating systems 131, 132, and 133 includes a separate interrupt descriptor table, for example IDT 331, 332, or 333 in FIG. 3, residing in the physical memory space of memory device 130. Each operating system uses the interrupt descriptor table to maintain entries associated with the interrupt vectors that are assigned ports on virtual HBAs. For example, operating system 131 uses IDT 331 in FIG. 3 to maintain entries associated with the interrupt vectors assigned to ports 214 and port 212.

In box, 450 port controller 170 binds ports from physical HBAs 181, 182, and 183 to ports on virtual HBAs 231, 232, 233, and 234. In FIG. 2, each of the ports 211 through 215 is a virtual port and is linked to a physical port on physical HBAs 181, 182, and 183. The link between ports on physical HBAs and ports on the virtual HBA is symbolically represented by broken lines, as shown in FIG. 2. In some embodiments, port controller 170 is configured to maintain the binding information corresponding the links (or associations) shown in FIG. 2. The binding information may be implemented by software, hardware, or a combination of both.

In some embodiments, the binding information includes a mapping of the interrupt vector assigned to a port on the physical HBA and the interrupt vector assigned to the corresponding port on the virtual physical HBA. For example, based on FIG. 2, the binding information may map the interrupt vector assigned to a port 201 to the interrupt vector assigned to the port 211. Port controller 170 uses the binding information to convert or relay an interrupt request from ports 201 through 205 to operating systems 131, 132, and 133.

Figure 5:
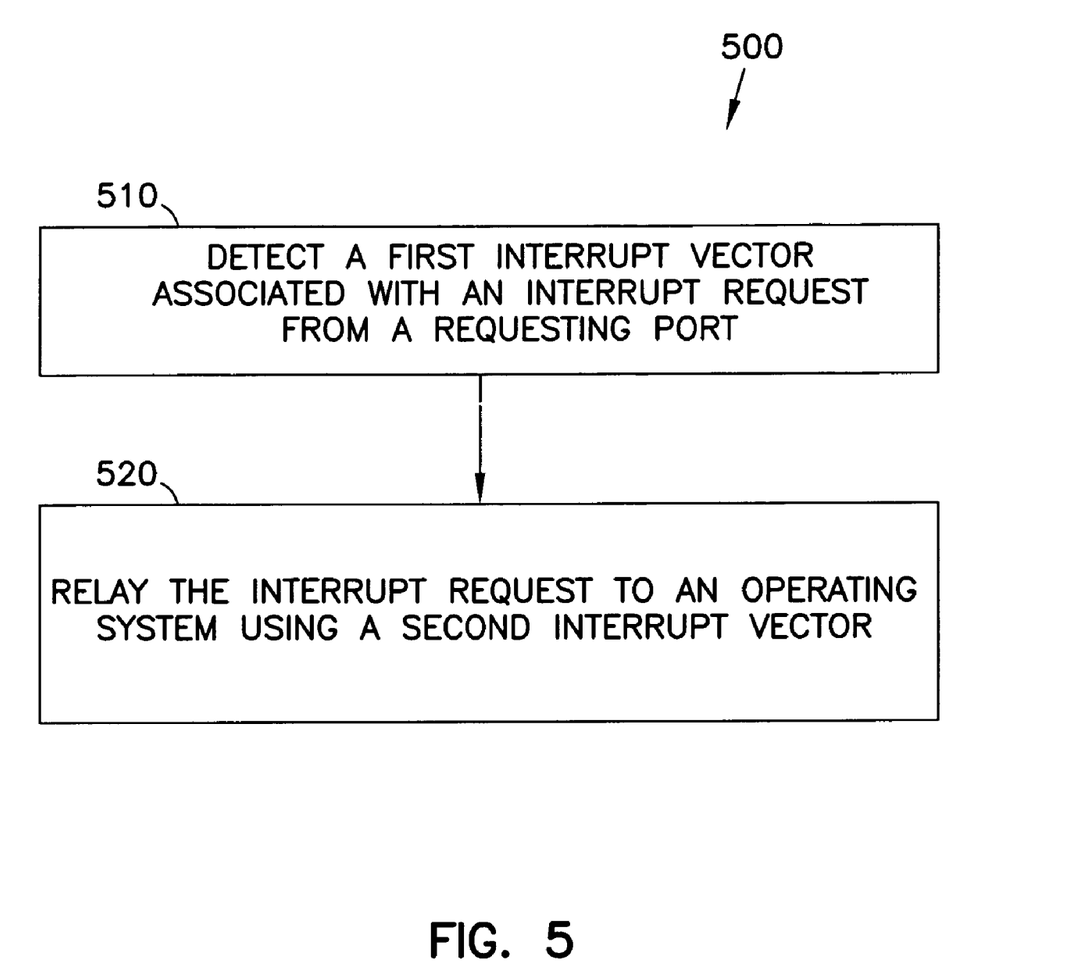
FIG. 5 is a flowchart showing a method according to another embodiment of the invention.

FIG. 5 is a flowchart of a method according to an embodiment of the invention. Method 500 is described in reference to system 100 in which system 100 is set up by the activities described in FIG. 4.

In box 510, port controller 170 detects an interrupt vector associated with an interrupt request from a requesting port. In some embodiments, the interrupt request is an MSI or MSI-X request according to the PCI-Express specification. The requesting port discussed in box 510 is one of the ports 201 through 205 on one of the physical HBAs 181, 182, and 183. In some embodiments, the interrupt request in box 510 is a write transaction on an interconnection such as I/O interconnection 187. The write transaction includes an address value and a data value corresponding to the interrupt vector assigned to the requesting port. For the activities in both box 510 and box 520, port 201 of HBA 181 is chosen to be the requesting port, as an example. Thus, in this example, port 201 (the requesting port) initiates the interrupt request to port controller 170 by performing a write transaction using the address and data values corresponding to the interrupt vector assigned to port 201. In some embodiments, port controller 170 detects the interrupt request by reading the address and data values from the write transaction initiated by port 201. After detecting the interrupt request, port controller 170 checks the binding information to determine which one of the operating systems 131, 132, and 133 that port 201 is allocated. In this example, port controller 170 determines that port 201 is allocated to operating system 133 (FIG. 2).

In box 520 of method 500, port controller 170 relays the interrupt request from port 201 to operating system 133 so that the interrupt request from port 201 can be serviced. In some embodiments, port controller 170 relays the interrupt request from port 201 to operating system 133 by performing a write transaction. Since port 201 is associated with port 211 (FIG. 2) on operating system 133, port controller 170 performs the write transaction using the address and data values corresponding to the interrupt vector assigned to port 211. Operating system 133 detects the interrupt request from port controller 170 and causes system resources such as chipset 120 and processors 110 and 111 to service the interrupt request from port 201. Thus, in method 500, port controller 170 relays the interrupt request from port-to-port controller to port-controller-to the operating system so that the requesting port can be serviced.

The individual activities in shown in FIG. 4 and FIG. 5 do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated.

The above description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar components throughout the several views. Examples merely typify possible variations. Portions and features of some embodiments may be included in or substituted for those of others. Many other embodiments will be apparent to those of skill in the art upon reading and understanding the above description. Therefore, the scope of various embodiments is determined by the appended claims, along with the full range of equivalents to which such claims are entitled.

What is claimed is:

1. A method comprising:
    initializing a plurality of ports on at least one physical host bus adapter, the plurality of ports including a first port and a second port, the initializing including assigning a first interrupt vector to the first port, the first interrupt vector including a first address value and a first data value;
    allocating the first port to a first operating system to create a first virtual host bus adapter in the first operating system, the first virtual host bus adapter including a port associated with the first port;
    allocating the second port to a second operating system to create a second virtual host bus adapter, the second virtual host bus adapter including a port associated with the second port;
    binding the first port of the plurality of ports to the port on the first virtual host bus adapter; and
    binding the second port of the plurality of ports to the port on the second virtual host bus adapter;
    a port controller and each operating system occupying a respective separate unique physical memory space and having a respective interrupt descriptor table in the respective physical memory space, the interrupt vectors being associated via the respective interrupt descriptor table of the port controller with entries in the respective interrupt descriptor tables of the operating systems, the entries being associated with the ports of the virtual host bus adapters.

2. The method of claim 1, wherein the initializing includes assigning a second interrupt vector to the second port on the host bus adapter.

3. The method of claim 2, wherein the allocating the first port includes assigning a third interrupt vector to the port on the first virtual host bus adapter, and wherein the allocating the second port includes assigning a fourth interrupt vector to the port on the second virtual host bus adapter.

4. The method of claim 3, wherein the binding the first port includes mapping the first interrupt vector to the third interrupt vector, and wherein the binding the second port includes mapping the second interrupt vector to the fourth interrupt vector.

5. The method of claim 3, wherein the each of the first, second, third, and fourth interrupt vectors includes a respective address value and a respective data value, and wherein each respective address value corresponds to a unique address space in a physical memory.

6. The method of claim 1, wherein both of the first port and the second port reside on a single host bus adapter.

7. The method of claim 6 further comprising:
allocating a third port of the plurality of ports to the second virtual host bus adapter of the second operating system, wherein the third port resides on a second host bus adapter, wherein the second host bus adapter is different from the single host bus adapter.

8. The method of claim 1 further comprising:
detecting an interrupt request from the first port of the plurality of ports;
reading the first address value and the first data value corresponding to the first interrupt vector associated with the first port of the plurality of ports; and
writing a second address value and a second data value corresponding to an interrupt vector associated with the port on the first virtual host bus adapter in the first operating system.

9. An apparatus comprising:
a first circuit to initialize a plurality of ports on at least one physical host bus adapter, the plurality of ports including a first port and a second port, the first circuit also being to assign a first interrupt vector to the first port, the first interrupt vector including a first address value and a first data value;
a port controller to allocate the first port to a first operating system to create a first virtual host bus adapter in the first operating system, the first virtual host bus adapter including a port associated with the first port, and to allocate the second port to a second operating system to create a second virtual host bus adapter, the second virtual host bus adapter including a port associated with the second port; and
a second circuit to bind the first port of the plurality of ports to the port on the first virtual host bus adapter, and to bind the second port of the plurality of ports to the port on the second virtual host bus adapter;
the port controller and each operating system occupying a respective separate unique physical memory space and having a respective interrupt descriptor table in the respective physical memory space, the interrupt vectors being associated via the respective interrupt descriptor table of the port controller with entries in the respective interrupt descriptor tables of the operating systems, the entries being associated with the ports of the virtual host bus adapters.

10. The apparatus of claim 9, wherein the first circuit is configured to assign a second interrupt vector to the second port on the host bus adapter.

11. The apparatus of claim 10, wherein the first operating system is configured to assign a third interrupt vector to the port on the first virtual host bus adapter, and wherein the second operating system is configured and to assign a fourth interrupt vector to the port on the second virtual host bus adapter.

12. The apparatus of claim 11, wherein the second circuit is configured to map the first interrupt vector to third interrupt vector, and to map the second interrupt vector to the fourth interrupt vector.

13. The apparatus of claim 9, wherein both of the first port and the second port reside on a single host bus adapter.

14. The apparatus of claim 13, wherein the port controller is configured to allocate a third port of the plurality of ports to the second virtual host bus adapter of the second operating system, wherein the third port resides on a second host bus adapter, wherein the second host bus adapter is different from the single host bus adapter.

15. The apparatus of claim 9, wherein the port controller is configured to detect an interrupt request from the first port of the plurality of ports, to read the first address value and the first data value corresponding to the first interrupt vector associated the first port of the plurality of ports, and to write a second address value and a second data value corresponding to an interrupt vector associated with the port on the first virtual host bus adapter in the first operating system.

16. A system comprising:
at least one physical host bus adapter having a plurality of ports, the plurality of ports includes a first port and a second port, wherein each port of the plurality of ports is associated with a connection to transfer data serially via the connection;
a first circuit to initialize the plurality of ports, the first circuit also being to assign a first interrupt vector to the first port, the first interrupt vector including a first address value and a first data value;
a port controller to allocate the first port to a first operating system to create a first virtual host bus adapter in the first operating system, the first virtual host bus adapter including a port associated with the first port, and to allocate the second port to a second operating system to create a second virtual host bus adapter, the second virtual host bus adapter including a port associated with the second port; and
a second circuit to bind the first port of the plurality of ports to the port on the first virtual host bus adapter, and to bind the second port of the plurality of ports to the port on the second virtual host bus adapter;
the port controller and each operating system occupying a respective separate unique physical memory space and having a respective interrupt descriptor table in the respective physical memory space, the interrupt vectors being associated via the respective interrupt descriptor table of the port controller with entries in the respective interrupt descriptor tables of the operating systems, the entries being associated with the ports of the virtual host bus adapters.

17. The system of claim 16, wherein the first circuit is configured to assign a second interrupt vector to the second port on the host bus adapter.

18. The system of claim 17, wherein the first operating system is configured to assign a third interrupt vector to the port on the first virtual host bus adapter, and wherein the second operating system is configured and to assign a fourth interrupt vector to the port on the second virtual host bus adapter.

19. The system of claim 18, wherein the second circuit is configured to map the first interrupt vector to the third interrupt vector, and to map the second interrupt vector to the fourth interrupt vector.

20. The system of claim 16, wherein both of the first port and the second port reside on a single host bus adapter.

21. The system of claim 20, wherein the port controller is configured to allocate a third port of the plurality of ports to the second virtual host bus adapter of the second operating system, wherein the third port resides on a second host bus adapter, wherein the second host bus adapter is different from the single host bus adapter.

22. The system of claim 16, wherein the port controller is configured to detect an interrupt request from the first port of the plurality of ports, to read the first address value and the first data value corresponding to the first interrupt vector associated with the first port of the plurality of ports, and to write a second address value and a second data value corresponding to an interrupt vector associated with the port on the first virtual host bus adapter in the first operating system.

23. An article including a machine-accessible medium having associated information, wherein the information, when accessed, results in a machine performing:
- initializing a plurality of ports on at least one physical host bus adapter, the plurality of ports including a first port and a second port, the initializing including assigning a first interrupt vector to the first port, the first interrupt vector including a first address value and a first data value;
- allocating the first port to a first operating system to create a first virtual host bus adapter in the first operating system, the first virtual host bus adapter including a port associated with the first port;
- allocating the second port to a second operating system to create a second virtual host bus adapter, the second virtual host bus adapter including a port associated with the second port;
- binding the first port of the plurality of ports to the port on the first virtual host bus adapter; and
- binding the second port of the plurality of ports to the port on the second virtual host bus adapter;
- a port controller and each operating system occupying a respective separate unique physical memory space and having a respective interrupt descriptor table in the respective physical memory space, the interrupt vectors being associated via the respective interrupt descriptor table of the port controller with entries in the respective interrupt descriptor tables of the operating systems, the entries being associated with the ports of the virtual host bus adapters.

24. The article of claim 23, wherein the initializing includes assigning a second interrupt vector to the second port on the host bus adapter.

25. The article of claim 24, wherein the allocating the first port includes assigning a third interrupt vector to the port on the first virtual host bus adapter, and wherein allocating the second port includes assigning a fourth interrupt vector to the port on the second virtual host bus adapter.

26. The article of claim 25, wherein the binding the first port includes mapping the first interrupt vector to the third interrupt vector, and wherein the binding the second port includes mapping the second interrupt vector to the fourth interrupt vector.

27. The article of claim 23, wherein both of the first port and the second port reside on a single host bus adapter.

28. The article of claim 27 further comprising:
- allocating a third port of the plurality of ports to the second virtual host bus adapter of the second operating system, wherein the third port resides on a second host bus adapter, wherein the second host bus adapter is different from the single host bus adapter.

29. The article of claim 28, wherein each of the first, second, third, and fourth interrupt vectors includes a respective address value and a respective data value, and wherein each respective address value corresponds to a unique address in a physical memory space.

30. The article of claim 23 further comprising:
- detecting an interrupt request from the first port of the plurality of ports;
- reading the first address value and the first data value corresponding to the first interrupt vector associated with the first port of the plurality of ports; and
- writing a second address value and a second data value corresponding to an interrupt vector associated with the port on the first virtual host bus adapter in the first operating system.

* * * * *